Figure 3:
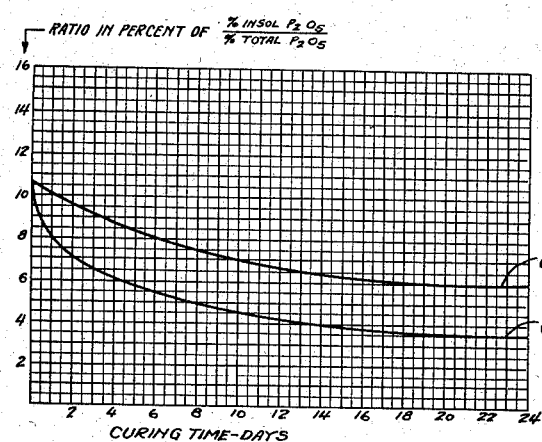
Figure 4:
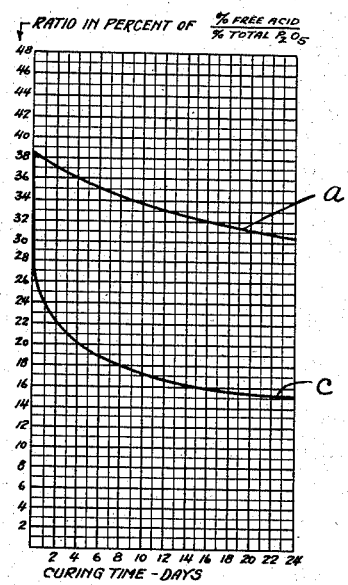
Figure 6:
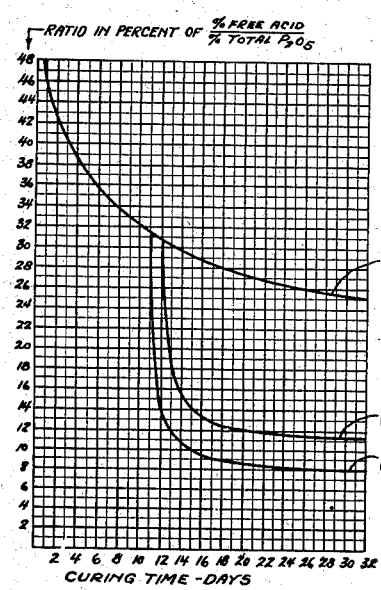
Figure 5:
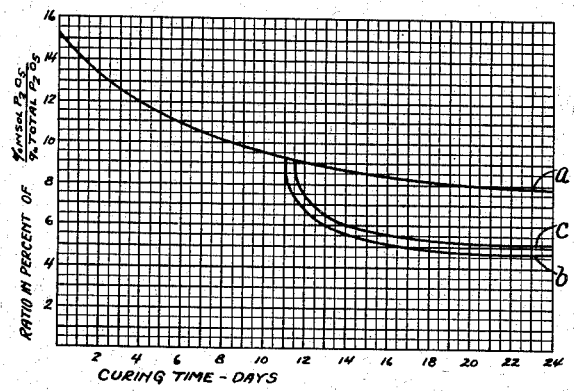

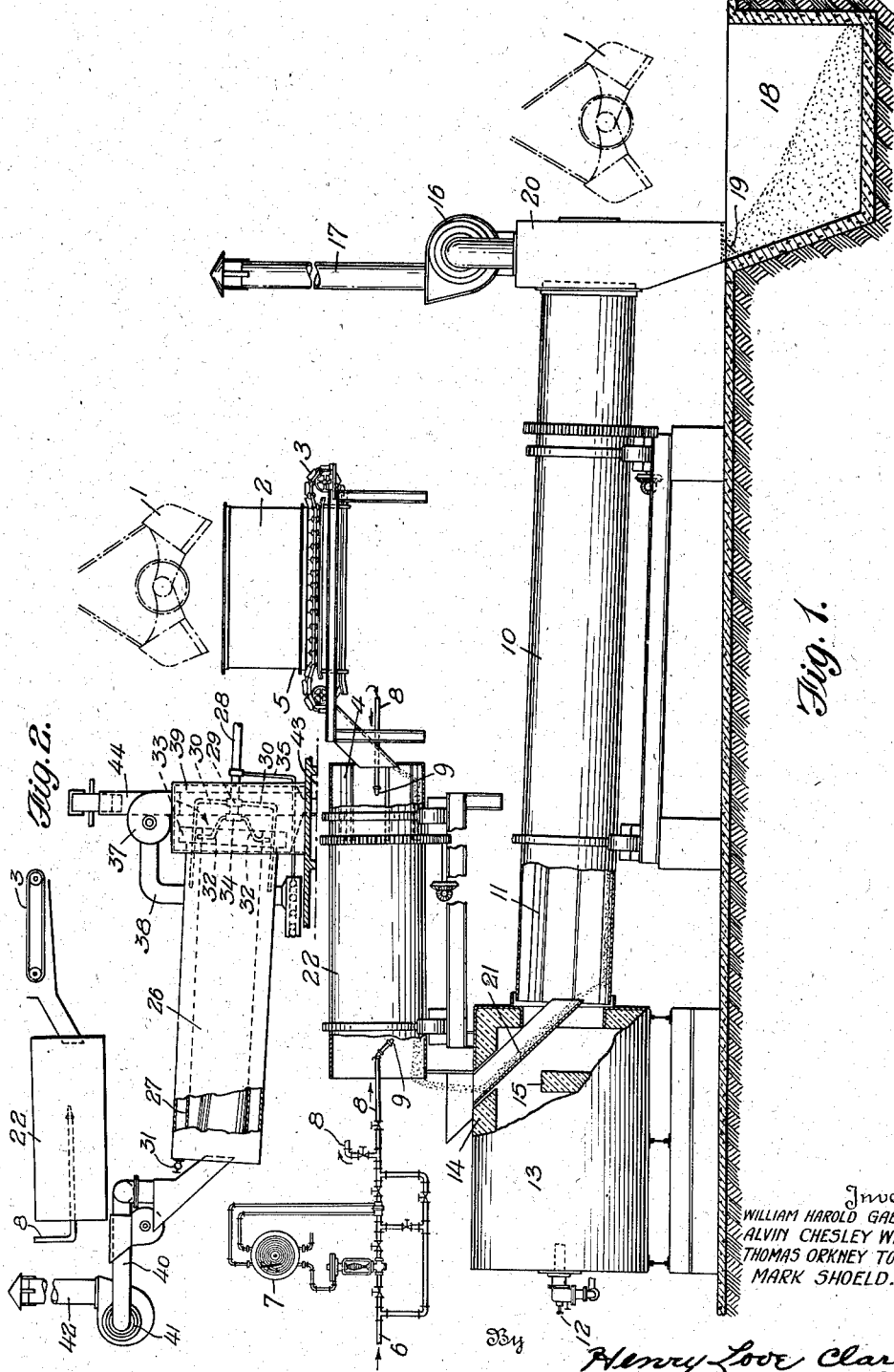

Inventors.
WILLIAM HAROLD GABELER,
ALVIN CHESLEY WILSON,
THOMAS ORKNEY TONGUE, and
MARK SHOELD.

By Henry Love Clarke
Attorney

Patented Nov. 15, 1938

2,136,793

UNITED STATES PATENT OFFICE 2,136,793

TREATMENT OF SUPERPHOSPHATE

William Harold Gabeler, Alvin Chesley Wilson, Thomas Orkney Tongue, and Mark Shoeld, Baltimore, Md., assignors, by mesne assignments, to The Davison Chemical Corporation, a corporation of Maryland Application December 11, 1935, Serial No. 53,990

8 Claims. (Cl. 71—40)

This invention relates in general to the production of fertilizer from phosphatic rock, and more particularly to an improved method of manufacturing superphosphate by itself or in admixture with other fertilizer ingredients.

The usual method of manufacturing superphosphate is by the so-called Den process. This involves batch mixing of ground phosphate rock and sulphuric acid in a pan mixer. After a relatively short mixing time the batch while still in a fluid or semi-fluid condition is dumped into a confined space called a Den. In some cases the mixing of ground rock and acid is made continuously in a horizontal trough mixer. The Den may either be stationary or movable as in mechanical Dens. The fresh superphosphate is allowed to set up in the den to a relatively soft solid mass. In case of stationary Dens the mass is dug out by means of a crane bucket and delivered to a curing pile. In some places the fresh superphosphate is rasped before being put on the curing pile. The rasping operation involves feeding the fresh superphosphate past rapidly revolving arms or knives which disintegrate the mass and aerates it. The purpose of this operation is to effect moisture elimination. In case of mechanical Dens the block of fresh superphosphate is always flaked or shaved off and aerated before it goes to the storage or curing pile. The practice has always been to use as strong acid as possible for the acidulation to reduce the amount of water in the superphosphate as much as possible. The purpose of the flaking and aeration is also largely to reduce the moisture content. The fresh superphosphate made with as strong acid as possible and frequently after subsequent aeration is placed on the curing pile where it remains for a period of generally not less than one month and ordinarily three to four months. The purpose of the curing period is to improve the physical condition of the superphosphate and to allow the chemical reaction to go to substantial completion. This reduces the insoluble $P_2O_5$ and the free acid and conversely the proportion of available $P_2O_5$ is increased.

If the superphosphate is to be sold for direct application to the soil it is necessary to further treat the cured acid phosphate to improve its physical condition so that it will not set or cake in bags or cause bag rot, and so that it will handle satisfactorily through a fertilizer drill. This is ordinarily accomplished by adding ground phosphate rock or ground dolomite or lime and sand or ground limestone and sand. This mixture is milled and screened and put in storage. During this storage of from two weeks to a month a certain amount of caking or set takes place. The material is milled and screened again and is then ready for shipment in bags or bulk. This treatment reduces the free acid and improves the physical condition, which although still far from ideal is accepted by the trade.

If the superphosphate is to be sold as mixed goods or so-called complete fertilizer, the cured superphosphate is dry mixed with other fertilizer ingredients and allowed to cure. During this curing the mixture sets or cakes. After a certain time period the mixture is milled and screened and is ready for shipment. It should be pointed out that a certain amount of organic material like tankage, ground tobacco stems, cottonseed meal, etc. is added to the mixture to improve the physical condition. This is a costly addition as the unit cost of nitrogen in organics is about two to three times as expensive as in inorganics. The fertilizer value of the organics is generally less than the inorganics, so the real purpose of the addition of organics is to improve the physical condition of the fertilizer.

All fertilizers are sold on guaranteed chemical analysis, so that the only commercial difference between any fertilizers of identical chemical composition is a difference in physical condition. The criterion on physical condition is in turn the free flowing and free drilling qualities of the fertilizer. A truly free flowing fertilizer consists of dry, hard, discrete granules of substantially uniform size, no dust and no oversize, thus no segregation possible.

The term curing is variously used in the fertilizer trade, referring either to reduction in insoluble $P_2O_5$ or improvement in physical condition and very often includes both. For the purpose of describing this invention accurately and clearly we will define the word "curing" as a reduction of insoluble $P_2O_5$ only, and will so use this term both in the remaining specification and in the claims. When we refer to improvement in physical condition we will so state.

A primary object of this invention is the provision of a method which substantially eliminates the storage time required for acid phosphate and entirely eliminates the preliminary storage of complete fertilizer, and which will rapidly reduce the insoluble $P_2O_5$ both in superphosphate and in complete fertilizer and also to a greater extent than has been possible heretofore, thus effecting economy on materials.

Another object of this invention is to produce superphosphate and complete fertilizer of improved physical condition of the character of porous, discrete, nodular, encrusted and indurated globoid particles in a simple and more economical manner.

The invention has for further objects a method which eliminates the necessity for cutting superphosphate and putting it through a milling and screening operation twice to improve its physical condition for direct application to the soil, and which will produce a complete fertilizer in granular form where each granule contains all the various fertilizer ingredients, thus eliminating the possibility of segregation of the various ingredients during handling and shipping and during application to the soil, and the invention has for still further objects such other improvements and advantages in operation or result as may be found to obtain in the method and apparatus hereinafter described or claimed.

In the accompanying drawings, forming a part of this specification, and showing, for purposes of exemplification, a preferred form and manner in which the invention may be embodied and practiced, but without limiting the claimed invention specifically to such illustrative instance or instances:

Figure I is a side elevational view of one type of apparatus adapted to carry out our process.

Fig. II is a diagrammatic view of another apparatus for carrying out the invention.

Figs. III, IV, V and VI are illustrative curve sheets showing velocities of curing reaction and reduction of free acid.

As has been previously described, the practice in the past during manufacture of acid phosphate from phosphate rock has been to use as strong acid as possible as well as to aerate the fresh superphosphate to reduce the moisture content to a minimum.

We have made the surprising discovery that by going in exactly opposite direction, that is, adding a small amount of water to superphosphate, made in the regular manner, and agitating it at atmospheric pressure and temperature to preliminarily nodulize the superphosphate and, directly thereafter, without intermediate storage-curing, removing the excess water from the preliminarily nodulized superphosphate by drying with heat while agitating it at atmospheric pressure, a most remarkable increase in curing rate as well as improvement in physical condition is obtained. Thus, instead of aerating the superphosphate to remove moisture, we actually maintain high moisture or add moisture and operate at atmospheric pressures to preliminarily nodulize it by tumbling to form discrete, nodular, firm particles before heating to dry the nodules and then directly subject these nodules to heating while tumbling until converted to discrete, nodular, encrusted and indurated globoid particles.

In making complete fertilizer by means of this invention, the preferred method is to mix superphosphate with other fertilizer ingredients, moisten and agitate the mixture to nodulize it and directly thereafter remove excess moisture from the pre-formed nodules by heating it as aforesaid. An even more distinct curing effect is obtained than in case of straight superphosphate and an improvement in physical condition to the extent that an ideal complete fertilizer is obtained.

Referring to Fig. I, a crane bucket 1 delivers fresh superphosphate out of the den, or partly cured den superphosphate, to feed hopper 2. An apron conveyor 3 made of slats delivers the superphosphate to a horizontal rotary cylinder 22, which is operating in room temperature and at atmospheric pressure with a substantial non-drying atmosphere and is set on a slight pitch and provided with lifting vanes 4 to agitate or tumble the material and thereby agglomerate it into discrete firm nodules. For simplicity this cylinder will be referred to as the conditioner. The lifting vanes 4 extend about one-fourth of the length of the cylinder 22 from its upper inlet end. The cylinder 22 is about 3½ feet in diameter, and about ten vanes or flights, approximately five inches high, distributed around the inner circumference of the first quarter of the cylinder suffice to initiate the agglomeration action of the superphosphate.

The rate of superphosphate feed is regulated by varying the speed of the slat conveyor 3 and an adjustable gate at 5 on the feed hopper 2. A water supply line 6 and a recording water meter 7 with automatic pressure adjustment deliver water through pipes 8 to atomizing sprays 9 a short distance inside each end of the cylinder 22. 10 is an ordinary single shell, concurrent, direct heat rotary drier operating at atmospheric pressure and provided with lifting vanes 11 to agitate or tumble the material like the conditioner 22. An oil burner 12 feeds a fire box 13 lined with fire-brick and having a refractory baffle wall 15 for introducing hot combustion gases into the drier 10 to heat the nodules to a temperature of about 180° F. An exhaust fan 16 and stack 17 deliver the combustion gases to the atmosphere. 18 is a preliminary storage pit, from which crane bucket 1 removes the treated material to storage. A swinging gate 19 allows the material to fall into the pit 18 without admitting air into the outlet end box 20 of the drier.

The conditioner 22 is operated at a speed of approximately 7 to 8 R. P. M. and the drier 10 about the same. The conditioner 22 is about 3½ feet in diameter and 15 feet long, whereas the drier is 3½ feet in diameter and 30 feet long, providing a capacity of about 100 tons of finished material per 24 hours.

The superphosphate is fed continuously into the conditioner 22 at a uniform rate by means of feeder 3. The purpose of the conditioner 22 is to agitate and agglomerate the superphosphate into relatively firm discrete nodules, like pellets or balls, of more or less uniform size before the nodules are subjected to drying. The conditioner is open at both ends so as to maintain a substantially non-drying atmosphere therein, that is, an atmosphere whose temperature and humidity is such relative to the temperature and moisture of the material that substantially no drying of the material occurs during the nodulizing step. Water may or may not be added at a uniform rate through pipes 8 and atomizing sprays 9. This addition of water will depend upon the age and the moisture content of the original superphosphate introduced into hopper 2. If water is added the quantity required is a function of not only the original moisture content of the superphosphate but also the age of the superphosphate, that is, whether or not it is taken directly out of the den or has first gone to an auxiliary intermediate storage. We have also found that the particle size of the nodules of agglomerated superphosphate issuing from the discharge end of the conditioner 22 is a function of the quantity of water addition. The nodulized superphosphate drops as discrete firm particles continuously from chute 21 directly into the drier. In the drier the pellets are further tumbled while progressing continuously therethrough as they are being heated and dried at atmospheric pressure by direct contact with the heating gases which provide a drying atmosphere and the pellets further hardened to porous, discrete, encrusted and indurated nodular globoid particles whence they are discharged from the drier. The dried material is removed to storage from pit 18 by means of crane bucket 1.

The material is required to stay in storage for a period of from only 2 to 3 days up to a week. During this period the pellets get very much harder and have a crushing strength in excess of several times as great as fully cured ordinary den superphosphate. The material is then milled and screened and is ready for shipment. By properly regulating the moisture content in the conditioner the quantity of over-size that has to be disintegrated is reduced to a minimum. If there is a tendency to form fines in the final product the rate of water addition in the conditioner is increased and if there is a tendency to form an excessive amount of over-size the water rate is reduced.

We have also discovered that while especially fresh superphosphate, when nodulized with too great a quantity of water, will form rather large agglomerations of from hazel-nut to fist size and even larger, nevertheless on passing through the direct heat drier these larger agglomerations break down into smaller pellets. The nodules while firm are in such instances of such physical condition that if taken out at the discharge end of the conditioner and put in a small pile, the separate discrete particles or nodules will tend to run together and form a claylike mass of the consistency of soft modelers clay.

Generally speaking in such instances the quantity of water added is decreased and we prefer to regulate the water addition so that the granules leaving the conditioner 22 are in such physical condition that they do not immediately coalesce if removed from the conditioner 22 and allowed to stand stationary in a pile before entering the drier 10. At least the tendency is not to run together into one clayey mass although there is some coalescence at the contact points of the firm granules.

In addition to this the moisture content is also regulated in accordance with the size of the material issuing from the drier so that when screen tested about two-thirds to three-fourths does not need to be crushed, that is over 70% will pass through an 8-mesh screen and most of the rest will pass through a 3-mesh screen.

We will now give some specific examples of operating conditions and products produced in accordance with our invention as well as comparative results of producing superphosphate in the old manner.

A quantity of 100 tons den superphosphate was made up in the usual manner. This superphosphate was made from 72.9% B. P. L. Florida rock and 55 Bé. sulphuric acid. The actual batches used in the mixing pan were as follows:

|  | Pounds |
|---|---|
| Ground rock | 1125 |
| 55 Bé. acid | 1071 |

The superphosphate taken out of the den analyzed:

|  | Per cent |
|---|---|
| Moisture | 10.29 |
| Total $P_2O_5$ | 19.68 |
| Insoluble $P_2O_5$ | 2.07 |
| Available $P_2O_5$ | 17.61 |
| Free acid | 7.55 |

The above determinations were made according to the A. O. A. C. official methods, except the free acid, for which there is no official method. The free acid was determined as $H_3PO_4$ by the tentative A. O. A. C. alcohol method.

Superphosphate of the above composition was promptly thereafter moistened by the addition of 2.2% water and nodulized in the conditioner 22 and then immediately dried in drier 10. The nodule material from the drier 10 analyzed as follows:

| Moisture | 7.72 |
|---|---|
| Total $P_2O_5$ | 19.80 |
| Insoluble $P_2O_5$ | 1.52 |
| Available $P_2O_5$ | 18.28 |
| Free acid | 4.76 |

To more clearly illustrate the effect of the preliminary nodulizing and immediately following drying operations we refer to curve sheet Fig. III. Curve (a) represents the portion of the superphosphate of the above composition and aged in curing piles. The insoluble $P_2O_5$ has been given as a ratio of the insoluble $P_2O_5$ over the total $P_2O_5$. This is for the purpose of making the curves truly representative as to the efficiency of conversion of insoluble $P_2O_5$ to available form. The insoluble has been plotted against time. In this manner any apparent variation in insoluble $P_2O_5$ due to variations in water content both free and fixed is eliminated. In other words, if the insoluble $P_2O_5$ read off the chart is deducted from 100, the resulting figure represents the percentage of acidulation or conversion of the $P_2O_5$ from insoluble to available form. Curve (c) represents the above superphosphate treated by means of our process.

Curve sheet Fig. IV represents the free acid reduction plotted against time. Curves (a) and (c) correspond to the same letters in Fig. III.

As a further illustration we give below the analyses of both superphosphates 12 days old.

|  | Regular superphosphate | Treated superphosphate |
|---|---|---|
| Moisture | 10.40 | 6.60 |
| Total $P_2O_5$ | 19.85 | 20.05 |
| Insoluble $P_2O_5$ | 1.34 | .88 |
| Available $P_2O_5$ | 18.51 | 19.17 |
| Free acid | 6.82 | 3.65 |

To show that our process is also effective on superphosphate that has stayed in the storage pile for some time another 100 ton pile of regular superphosphate was set aside. The analysis of this material when made and 12 days old was as follows:

|  | Fresh | 12 days old |
|---|---|---|
| Moisture | 10.14 | 9.38 |
| Total $P_2O_5$ | 19.85 | 19.98 |
| Insoluble $P_2O_5$ | 3.04 | 1.94 |
| Available $P_2O_5$ | 16.81 | 18.04 |
| Free acid | 10.00 | 6.08 |

This 12 day old material was moistened in the conditioner with 6.7% water and nodulized therein. The treated material immediately after direct treatment in the drier and after 3 days analyzed:

|  | Treated material | |
|---|---|---|
|  | Immediate | 3 days |
| Moisture | 5.40 | 4.04 |
| Total $P_2O_5$ | 20.98 | 21.00 |
| Insoluble $P_2O_5$ | 1.42 | 1.14 |
| Available $P_2O_5$ | 19.56 | 19.86 |
| Free acid | 4.44 | 2.86 |

The regular superphosphate 24 days after making and the treated superphosphate 12 days after the treatment (which corresponds to 24 days from the initial superphosphate) analyzed as follows:

|  | Untreated | Treated |
| --- | --- | --- |
| Moisture | 9.02 | 4.40 |
| Total $P_2O_5$ | 20.05 | 21.03 |
| Insoluble $P_2O_5$ | 1.50 | 1.12 |
| Available $P_2O_5$ | 18.55 | 19.91 |
| Free acid | 5.06 | 2.54 |

This is represented graphically in curve sheets Figs. V and VI where curve (a) represents the regular superphosphate and curve (c) the treated superphosphate as described above. For the purpose of preparing all the curve sheets the piles of materials were resampled and analyzed every few days. The curves represent mean or average results.

We are not able to definitely state why the above beneficial results are obtained. Merely as a theory and without binding ourselves thereto, we suggest the following explanation.

The free acid in superphosphate is substantially always $H_3PO_4$. If any $H_2SO_4$ is present it is only in traces. The wetting and nodulating of the superphosphate may redistribute this phosphoric acid and may likely cause some hydrolysis of the monocalcium phosphate. On drying, the acid is concentrated and this as well as the elevated temperature of the material in the drier (about 180°F.) facilitates the attack of the free phosphoric acid on the insoluble $P_2O_5$. It may be mentioned at this point that with strong phosphoric acid the acidulating reaction is faster than with weak phosphoric acid. This is in contradiction to sulphuric acid. If sulphuric acid is used for the original acidulation in a strength of 60 Bé. or higher, the acidulating reaction is largely inhibited.

The attempt to dry superphosphate to improve its physical condition is old and the material produced is substantially finely powdered and there is no curing. More often there is an actual reversion of $P_2O_5$, that is an increase of insoluble $P_2O_5$. It is the nodulizing operation at room temperature and atmospheric pressure preliminarily but in conjunction with the directly following drying operation at atmospheric pressure which produces the beneficial results both as to curing and as to physical condition.

As an example of large scale drying tests (drying only without the preliminary nodulation) on superphosphate we give the following for a direct heat dryer.

|  | Before drying | After drying |
| --- | --- | --- |
| Moisture | 12.76 | 3.49 |
| Total $P_2O_5$ | 19.00 | 20.08 |
| Insoluble $P_2O_5$ | 1.68 | 1.71 |
| Available $P_2O_5$ | 17.32 | 19.09 |
| Free acid | 9.52 | 7.14 |

The dried material was not nodular but very dusty and thus unsatisfactory from the standpoint of physical condition.

An example of only drying regular superphosphate in a steam heated dryer is as follows:

|  | Before drying | After drying |
| --- | --- | --- |
| Moisture | 9.96 | 6.36 |
| Total $P_2O_5$ | 20.08 | 20.95 |
| Insoluble $P_2O_5$ | 2.20 | 2.46 |
| Available $P_2O_5$ | 17.88 | 18.49 |
| Free acid | 9.04 | 8.24 |

Here the dried material was also of unsatisfactory physical condition, because it was substantially all in the form of fines.

The preliminary nodulizing operation in itself improves the curing. In conjunction with the directly following drying operation, however, the beneficial result is vastly improved.

An example of only nodulizing the superphosphate with 1.9% of water is as follows:

|  | Original superphosphate | Nodulized superphosphate |
| --- | --- | --- |
| Moisture | 9.14 | 11.04 |
| Total $P_2O_5$ | 20.00 | 19.58 |
| Insoluble $P_2O_5$ | 1.80 | 1.58 |
| Available $P_2O_5$ | 18.20 | 18.00 |
| Free acid | 6.03 | 5.87 |

If the superphosphate is made originally with a sufficiently high moisture content it is nodulized without water addition. The following superphosphate was nodulized without water addition:

Moisture _____ 12.32
Total $P_2O_5$ _____ 19.25
Insoluble $P_2O_5$ _____ 3.06
Available $P_2O_5$ _____ 16.19
Free acid _____ 11.11

It is to be understood that we do not limit our invention in all its aspects to the particular kind of conditioner described for the nodulizing step. We may for instance use a pug mill, consisting of a horizontal trough mixer provided with a horizontal shaft with blades or arms set at a suitable angle. On the other hand we may use a dough mixer with sigma blades. Further, we may for example use a Chilean mill as the conditioner.

In the previously given examples the moisture content of the treated superphosphate has been reduced below the moisture content of the original untreated material. Although we prefer to bring the moisture content down to about 5%, this is not necessary for the purpose of realizing beneficial results by our invention. We have for instance taken superphosphate of 9% and nodulized this material with a water addition of 4½% subsequently drying the firm nodules to the original 9% moisture. After one day the pellets produced were hard and of excellent physical condition. This brings out a point of our process that it is not necessarily dependent upon a moisture reduction of the original superphosphate. We have no definite explanation as to why this happens. As a theory, it may be that the nodulation step brings the individual particles of superphosphate in close contact with each other and that subsequent recrystallizing phenomena set the material to hard, and, to all appearance, dry pellets without necessarily showing a lower moisture content by analysis than the original superphosphate. The results of the product emphasize the fact that the invention not only improves the curing or the chemical analysis of the superphosphate, but also produces a superphosphate of greatly superior physical condition.

As has been previously set forth, the nodulation operation may or may not require water addition to the superphosphate. It is further to be understood that instead of adding water other wetting agents may be used in the nodulation step, as for instance, water solutions of sulphuric acid, phosphoric acid, potassium chloride, potassium sulphate, sodium nitrate. In case water solutions of acids are used in the nodulation step, a certain amount of ground phosphate rock is mixed with the superphosphate as it is being nodulized or before it is nodulized. This will furnish additional available $P_2O_5$. In using a water solution of for instance potassium chloride, a small amount of phosphate rock is also added. This will be referred to more specifically in subsequent description of making complete fertilizer by means of our process.

Moreover, in nodulizing superphosphate without water addition we may for instance take the fresh acid phosphate made by mixing rock and acid and treat this in our nodulizing step without first letting it go through the usual setting stage. The nodules of superphosphate in firm pellet form are then dried preferably convectively directly as they come from the nodulizing step.

The above is the present preferred method of carrying out our invention as well as certain modifications. The nodulizing and drying of the process may however be embodied in other manners as, for example, in a single rotary drum with indirect heating in a steam jacketed drier as illustrated diagrammatically in Fig. II.

In such instance the material is first moistened in a moistener similar to conditioner 22 and then fed progressively through the steam jacket drier. In such modification the preliminary nodulization step occurs in the forepart and the drying in the afterpart of the drier. To this end the drum is open to the atmosphere and air flows countercurrent, thereby maintaining in the forepart an atmosphere whose temperature and humidity is such relative to the temperature and moisture content of the material in the nodulizing region of the drum that substantially no drying of the material occurs during the nodulization in the forepart of the drier. In the afterpart of the drum, the temperature of the pre-formed nodules is raised so that the relative temperature and moisture conditions between the atmosphere in the drying region of the drum and the pre-formed nodules in the after part of the drum are such that a substantial drying atmosphere exists and the nodules dried.

The system of delivering and feeding as well as wetting the superphosphate is the same as shown in Fig. I, and previously described except nodulization does not occur in the moistener 22. Instead of a direct heat drier, a steam jacketed drier 26 is provided which is heated with steam in the steam jacket 27, the steam being introduced through pipe 28, stuffing box 29 and spider arm pipes 30. A vent cock 31 at the charging end of the drier eliminates permanent gases from the inside of the steam jacket, especially venting the air when starting the drier. Spider arm pipes 32 convey away the condensed water by means of a bucket arrangement in the hollow end ring 33. The condensed water leaves through stuffing box 34 and pipe 35 and goes through an air preheating coil and then through a steam trap to waste. The drier is equipped with lifting vanes comprising flat irons spaced slightly apart as well as slightly away from the shell. The bars are supported every few feet by means of studs or pins fastened to the inside of the drier shell. Air is delivered to the inside of the drier by means of fan 37. The air is pulled past the air heating coil through duct 38 and is delivered inside the stationary drier head 39. The drier is vented through pipe 40, fan 41 and stack 42. The dried material discharged from the drier falls into pit 43 and is elevated by means of bucket elevator to a storage pile.

The function of the conditioner as mentioned above, is somewhat different from the examples cited in connection with the apparatus in Fig. I. Here water is added but in a quantity insufficient to cause any substantial agglomeration in the conditioner.

The nodulizing of the superphosphate takes place in the upper forepart or feed end of steam drier 26. The induction and exhaust fans 37 and 41 are so regulated that the vapor pressure of water at the feed end is substantially at atmospheric pressure. In this part of the drier the material is therefore heated up in a substantially non-drying atmosphere without any drying and the rotation of the drier causes the preliminary nodulation of the superphosphate before drying.

The nodulized superphosphate in the form of small pellets is dried at atmospheric pressure in continuous travel through the remaining part of the drier. Although the material is reasonably strong mechanically as it comes from the drier, it attains further hardness during storage after a day or two.

The aim of accelerated curing is also attained in this operation. This is graphically illustrated in curve sheets V and VI, where curve (a) represents the original superphosphate untreated by the present method and curve (b) represents the treated superphosphate of the present method.

The following tabulation shows some of the specific analyses:

|  | Untreated | Treated | Treated 4 days after treatment |
|---|---|---|---|
| Moisture | 9.38 | 5.50 | 3.72 |
| Total $P_2O_5$ | 19.98 | 20.53 | 20.65 |
| Insoluble $P_2O_5$ | 1.94 | 1.36 | 1.16 |
| Available $P_2O_5$ | 18.04 | 19.17 | 19.49 |
| Free acid | 6.08 | 3.49 | 2.06 |

Two weeks after treatment the treated and the untreated materials analyzed as follows:

|  | Untreated | Treated |
|---|---|---|
| Moisture | 8.96 | 4.36 |
| Total $P_2O_5$ | 19.88 | 20.68 |
| Insoluble $P_2O_5$ | 1.48 | 0.94 |
| Available $P_2O_5$ | 18.40 | 19.74 |
| Free acid | 5.08 | 1.90 |

The curve sheets Figs. V and VI, giving the curves (a) and (b) respectively show that the original superphosphate was 11 days old when treated. This particular type of apparatus is not so effective for treating freshly made superphosphate right from the den as a coating builds up on the steam jacket, which effectively insulates it and prevents heat transmission, but is effective on partly cured superphosphate. The superphosphate should be at least one week old and preferably from 10 days to two weeks old.

The quantity of water required for moistening the superphosphate is also in this case primarily a function of the age of the superphosphate. In the last mentioned example the quantity of water used was 5.5%. The same original superphosphate treated in the apparatus of Fig. I requires 6.7% water added to the conditioner. Generally speaking, the quantity of water required in the apparatus of Fig. I is definitely higher than the amount required in the apparatus of Fig. II (with the same original superphosphate).

In addition to being a function of the age of the original superphosphate used, the quantity of water required is also governed by the particle size or granule of the treated material that is desired. If the treated material has a tendency to go to fines, the quantity of water used is increased and if the particle size has a tendency to get too large the rate of water addition is reduced.

In addition to handling straight superphosphate by means of our process we have further discovered that the curing benefit obtained with complete fertilizers is even more pronounced than in the case of straight superphosphate.

When making complete fertilizer by means of our process the raw materials are preferably mixed before being fed into the conditioner, although the entire mixing operation may be performed in the conditioner.

We have discovered that the curing action, that is, changing of insoluble $P_2O_5$ to available $P_2O_5$, is in this case so active that a certain amount of ground phosphate rock added to the mixture will produce available $P_2O_5$.

As a specific example of making complete fertilizer by means of our process we furnish the following:

The superphosphate used analyzed:

| | |
|---|---|
| Moisture | 10.40 |
| Total $P_2O_5$ | 19.85 |
| Insoluble $P_2O_5$ | 1.61 |
| Available $P_2O_5$ | 18.24 |
| Free acid | 6.66 |

The $P_2O_5$ content of the phosphate rock was 33.4%.

To one net ton of superphosphate, 100 lbs. of ground phosphate rock was added, or in other words the weight of the phosphate rock was 5% of the weight of the superphosphate. Stated on a $P_2O_5$ basis, the weight of the $P_2O_5$ in the phosphate rock was 8.4% of the weight of the total $P_2O_5$ in the superphosphate.

To the mixture of superphosphate and phosphate rock was added ammonium sulphate and potassium chloride to make the complete mixture contain approximately even amounts of available $P_2O_5$, $N_2$ and $K_2O$.

The mixed materials were nodulized in the conditioner 22 with a water addition of 9.3% and directly dried in the drier of Fig. I as above described.

The finished treated material analyzed as follows:

| | |
|---|---|
| Moisture | 5.92 |
| Total $P_2O_5$ | 8.94 |
| Insoluble $P_2O_5$ | 0.84 |
| Available $P_2O_5$ | 8.10 |
| $N_2$ | 7.89 |
| $K_2O$ | 7.19 |

This was immediately after manufacture. After one week the insoluble $P_2O_5$ had dropped to 0.55%.

The above analyses show that slightly over 75% of the $P_2O_5$ in the phosphate rock had been made available immediately and after one week all the $P_2O_5$ from the rock had been made available, as well as about 20% reduction of the insoluble $P_2O_5$ in the original superphosphate. This means production of available $P_2O_5$ from the phosphate rock without the use of any acid.

Exactly why this happens we do not know. The free phosphoric acid present in the superphosphate is not enough to account for this conversion of $P_2O_5$ to available form. It is possibly due to the action of monocalcium phosphate or hydrolyzation products of the monocalcium phosphate upon the potassium chloride, which would free some hydrochloric acid which would attack the rock and make it available. No matter what reason the fact remains that the $P_2O_5$ is converted to available form.

The physical condition of the treated complete fertilizer is of the excellent character of discrete encrusted and indurated nodular globoid particles.

The universally practiced method of manufacturing complete fertilizer up to the present time, as described in the beginning of this specification, has been to dry mix the various materials and allow them to set. The set material is milled and the setting and milling operation is often performed twice. In addition to this it is necessary to add organics to improve the physical condition of the material. The setting phenomena seem to be due to interaction and recrystallization of the various salts present in the mixture, as for instance monocalcium phosphate and ammonium sulphate forming monoammonium phosphate and calcium sulphate at the contact surfaces between the particles.

By means of our invention all these interactions take place during the treatment, so that the resulting granular product is a stable and non-setting material. The need for the use of organics is also eliminated, which is of considerable economic advantage.

Another significant advantage is that each granule of our complete fertilizer contains all the various plant foods. This means non-segregation in handling and in distribution on the soil. The even distribution of the fertilizer on the field is of paramount importance from the standpoint of maximum crop yields from a minimum amount of fertilizer applied.

Instead of using the nitrogenous and potash containing materials specified in the above given example we may use others, as for instance, nitrate of soda or urea for the nitrogenous material and potassium sulphate or manure salt for the potash containing material.

The following is an example of the complete fertilizer produced by the method in the apparatus of Fig. II.

The analysis of the superphosphate used was as follows:

| | |
|---|---|
| Moisture | 9.58 |
| Total $P_2O_5$ | 19.88 |
| Insoluble $P_2O_5$ | 1.16 |
| Available $P_2O_5$ | 18.72 |
| Free acid | 5.0 |

The phosphate rock contained 33.4% $P_2O_5$.

The amount of ground phosphate rock used was the same as in the previously given example, that is, 5% by weight of the superphosphate. Ammonium sulphate and potassium chloride was mixed with the superphosphate and ground rock to furnish a ratio of approximately $$1N_2 : 2P_2O_5 : 1K_2O.$$

This mixture was treated in accordance with the invention in the apparatus of Fig. II and conditioned by adding 7.2% water.

Immediately after manufacture the finished material analyzed:

| | |
|---|---|
| Moisture | 6.82 |
| Total $P_2O_5$ | 12.85 |
| Insoluble $P_2O_5$ | 1.16 |
| Available $P_2O_5$ | 11.69 |
| $N_2$ | 5.22 |
| $K_2O$ | 5.11 |

After 13 days the insoluble $P_2O_5$ had dropped to 0.91%.

From this it will be seen that approximately 55% of the $P_2O_5$ in the phosphate rock had been made available immediately, and after 13 days approximately 80% of the $P_2O_5$ in the rock had been made available.

Although the above results described in connection with Fig. II are fully satisfactory from the standpoint of granular superphosphate, the capacity of such an installation, without duplication of units or unduly lengthening the drum, is relatively small in comparison to commercial quantities and the area of the zone in which nodulizing occurs in the forepart of the steam drum is not readily controllable, since the area will fluctuate with variation in the character of the superphosphate, such as its age or moisture content. The method as described in connection with Fig. I is more advantageous since, regardless of the character of the superphosphate, the nodulizing and drying steps are separately controllable and independently regulable, and products such as those above described in connection with Fig. I were readily obtainable on large scale full capacity operation and in quantities comparable to commercial production with a single unit as in Fig. I comparable in size with a single unit as illustrated in Fig. II.

The invention as hereinabove set forth is embodied and practiced in particular manners but may be variously embodied and practiced within the scope of the following claims.

We claim:

1. A continuous process of manufacturing superphosphate to produce accelerated curing which comprises first preliminary conditioning a mass of superphosphate by tumbling the same in the presence of an aqueous medium in amount sufficient to cause nodulization and in a substantially non-drying atmosphere while moving in a continuous stream through a rotary container at atmospheric pressure until the mass is agglomerated to firm nodules and contains the aqueous medium distributed throughout the same to at least a stage at which there is a tendency to some coalescence of the agglomerated solid nodules as they issue from the conditioning step, so that the nodular mass passing thence directly into the drying step may retain a moisture content sufficient to inhibit reversion and promote accelerated curing in the drying step, and then directly thereafter heating the preliminarily conditioned material, while still in at least such wetted condition of tending to cause coalescence, in a drying atmosphere while tumbling the same at atmospheric pressure in a stream moving continuously through a rotary container until the product becomes dried and indurated nodules.

2. A continuous process of manufacturing superphosphate to produce accelerated curing which comprises first preliminarily conditioning a mass of freshly prepared den superphosphate by tumbling the same in the presence of an aqueous medium in amount sufficient to cause nodulization and in a substantially non-drying atmosphere while moving in a continuous stream through a rotary container at atmospheric pressure until the mass is agglomerated to firm nodules and contains the aqueous medium distributed throughout the same to at least a stage at which there is a tendency to some coalescence of the agglomerated solid nodules as they issue from the conditioning step, so that the nodular mass passing thence directly into the drying step may retain a moisture content sufficient to inhibit reversion and promote accelerated curing in the drying step, and then directly thereafter heating the preliminarily conditioned material, while still in at least such wetted condition of tending to cause coalescence, in a drying atmosphere while tumbling the same at atmospheric pressure in a stream moving continuously through a rotary container until the product becomes dried and indurated nodules.

3. A continuous process of manufacturing superphosphate to produce accelerated curing which comprises first preliminarily conditioning a mass of partly storage cured den superphosphate by tumbling the same in the presence of an aqueous medium in amount sufficient to cause nodulization and in a substantially non-drying atmosphere while moving in a continuous stream through a rotary container at atmospheric pressure until the mass is agglomerated to firm nodules and contains the aqueous medium distributed throughout the same to at least a stage at which there is a tendency to some coalescence of the agglomerated solid nodules as they issue from the conditioning step, so that the nodular mass passing thence directly into the drying step may retain a moisture content sufficient to inhibit reversion and promote accelerated curing in the drying step, and then directly thereafter heating the preliminarily conditioned material, while still in at least such wetted condition of tending to cause coalescence in a dry atmosphere while tumbling the same at atmospheric pressure in a stream moving continuously through a rotary container until the product becomes dried and indurated granular nodules.

4. A continuous process of manufacturing complete fertilizer to produce accelerated curing which comprises first preliminarily conditioning a mass of a mixture of superphosphate and other fertilizer ingredients by tumbling the same in the presence of an aqueous medium in amount sufficient to cause nodulization and in a substantially non-drying atmosphere while moving in a continuous stream through a rotary container at atmospheric pressure until the mass is agglomerated to firm nodules and contains the aqueous medium distributed throughout the same to at least a stage at which there is a tendency to some coalescence of the agglomerated solid nodules as they issue from the conditioning step, so that the nodular mass passing thence directly into the drying step may retain a moisture content sufficient to inhibit reversion and promote accelerated curing in the drying step, and then directly thereafter heating the preliminarily conditioned material, while still in at least such wetted condition of tending to cause coalescence, in a drying atmosphere while tumbling at atmospheric pressure in a stream moving continuously through a rotary container until the product becomes dried and indurated granular nodules.

5. A method as claimed in claim 1 and in which the heating is effected by direct contact with hot gasses.

6. A method as claimed in claim 1 and in which the heating is effected by direct contact with a co-current flow of hot gases.

7. A method as claimed in claim 1 and in which the preliminary conditioning and the subsequent drying steps are effected in separate chambers continuously and the preliminarily conditioned material transferred continuously from the conditioning chamber to the drying chamber.

8. The process of granulating superphosphate which comprises adding water thereto in amount sufficient to produce approximately 11%-17% moisture in the resulting mixture, agitating the mixture to produce agglomeration, and then tumbling the resulting material in a heated rotary drum until dry hard granules are formed.

WILIAM HAROLD GABELER.
ALVIN CHESLEY WILSON.
THOMAS ORKNEY TONGUE.
MARK SHOELD.